United States Patent
Lund

[15] 3,698,609
[45] Oct. 17, 1972

[54] COMBINATION HITCH BUMPER AND SPARE TIRE CARRIER

[72] Inventor: Clifford C. Lund, Box 384, Moroni, Utah 84646

[22] Filed: April 5, 1971

[21] Appl. No.: 131,360

Related U.S. Application Data

[63] Continuation-in-part of Ser. No. 819,396, April 25, 1969, abandoned.

[52] U.S. Cl. .........224/42.05, 224/42.06, 224/42.23, 293/69, 293/73
[51] Int. Cl. ..........................................B62d 43/00
[58] Field of Search...224/42.05, 42.06, 42.23, 42.03 R, 224/42.26, 42.19; 214/451, 453; 293/69 R, 73

[56] References Cited

UNITED STATES PATENTS

| | | | |
|---|---|---|---|
| 3,398,846 | 8/1968 | Ragan et al. | 224/42.23 X |
| 2,661,131 | 12/1953 | Roy | 224/42.26 |
| 1,513,991 | 11/1924 | Homan | 293/73 X |
| 1,379,591 | 5/1921 | Forschler | 224/42.23 |
| 1,761,916 | 6/1930 | Hebner | 224/42.23 X |
| 1,578,823 | 3/1926 | Green | 224/42.23 |
| 1,589,955 | 6/1926 | Green | 224/42.23 |
| 2,603,527 | 7/1952 | Perkins | 224/42.05 X |
| 3,018,897 | 1/1962 | Carlyle | 224/45.16 X |
| 1,628,538 | 5/1927 | Freeman | 224/42.23 |

Primary Examiner—Gerald M. Forlenza
Assistant Examiner—Jerold M. Forsberg
Attorney—Berman, Davidson & Berman

[57] ABSTRACT

A combination hitch, bumper and spare tire carrier including a cradle formed of straps to seat a spare tire horizontally below the bed of a towing vehicle, a spring-pressed tire clamp secured to one of said straps and engaging the spare tire to hold the same in said cradle, a pair of wrap-around bumpers secured to longitudinal rails of the vehicle frame and protecting the rear corners of the towing vehicle, a hitch plate joined to and extending between said bumpers to hide and prevent access to the spare tire, said hitch plate being releasable from the bumpers and hingedly mounted to lift and turn to a raised position providing access to the spare tire for ready removal thereof in a rearward direction.

In a modified form of the invention the spring-pressed tire clamp is omitted and the tire is retained in place by the hitch plate.

12 Claims, 13 Drawing Figures

INVENTOR.
CLIFFORD C. LUND,
BY
Berman, Davidson & Berman
ATTORNEYS.

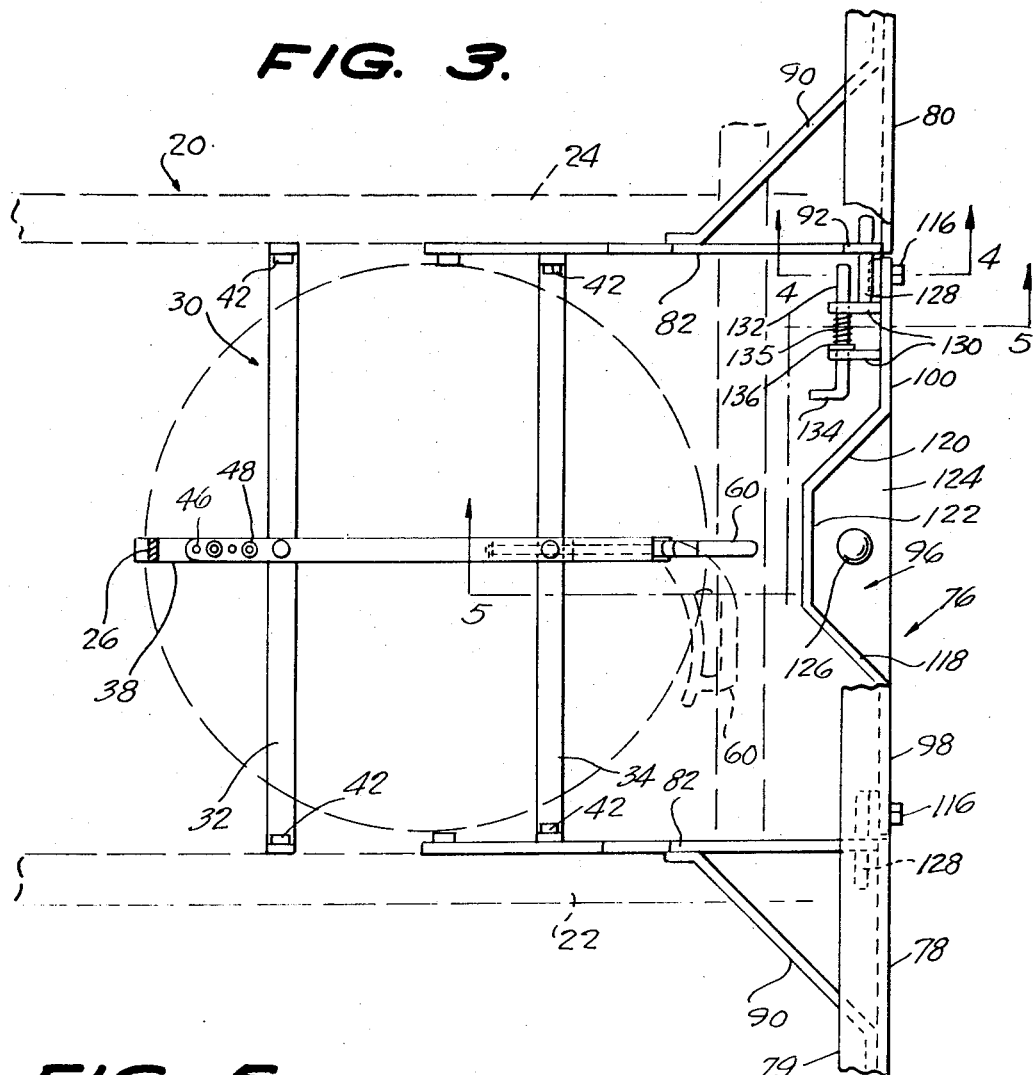
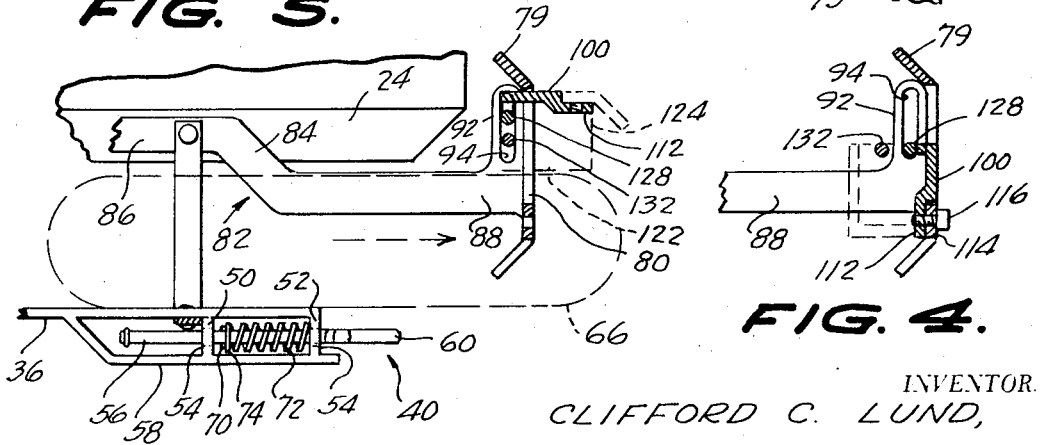

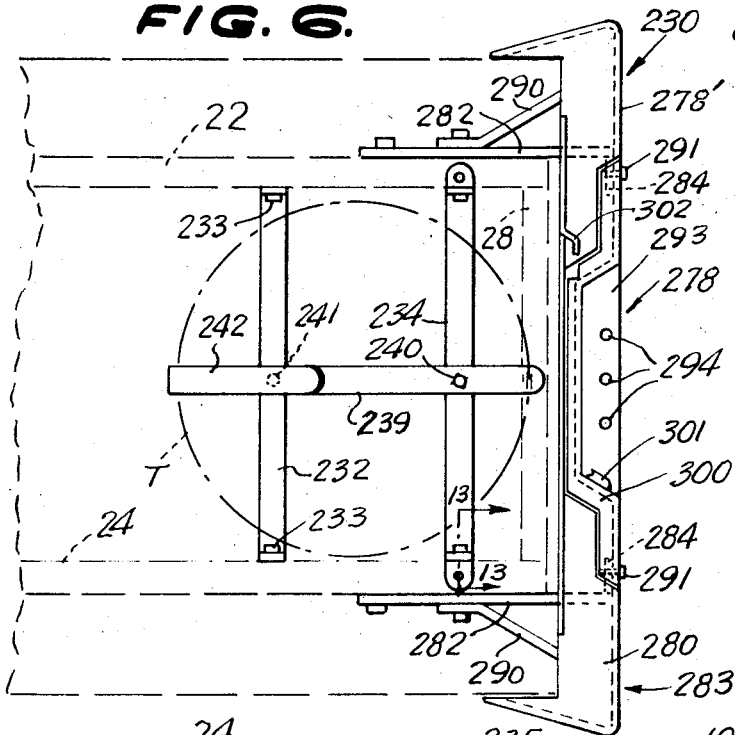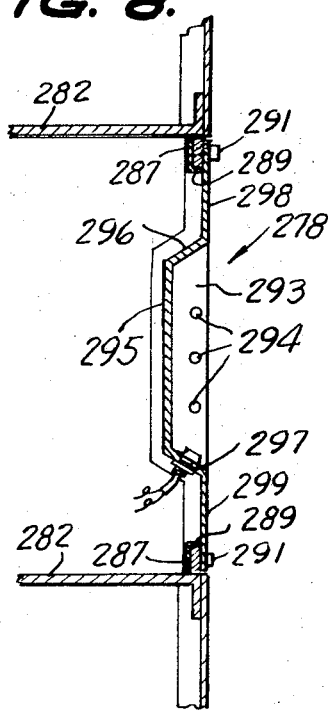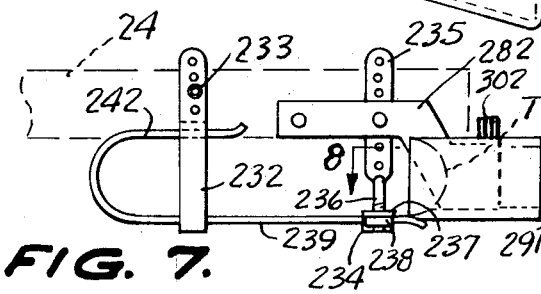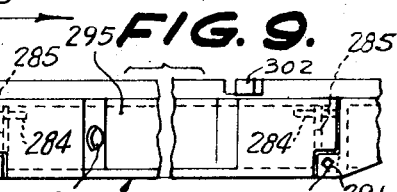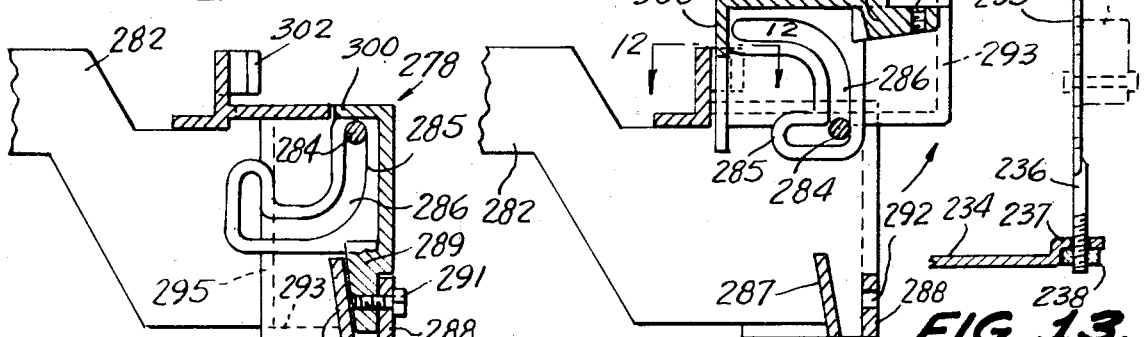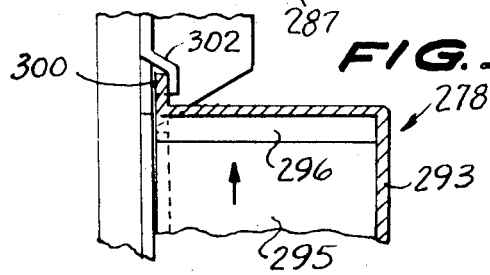

COMBINATION HITCH BUMPER AND SPARE TIRE CARRIER

This application is a continuation-in-part of my copending application, Ser. No. 819,396, filed Apr. 25, 1969, entitled "Combination Hitch, Bumper and Spare Tire Carrier" now abandoned.

This invention relates generally to carriers for spare tires of motor vehicles, and more particularly to a combination hitch, bumper and spare tire carrier for a pick-up truck, camper, or the like, wherein the carrier is mounted below the rear of the truck bed and hidden by the bumper and hitch plate, said hitch plate being releasably mounted and hinged to move upward and turn to a position yielding ready access to the spare tire for its removal and use.

As used herein the term "spare tire" is defined as being applicable not only to a spare tire alone, but to such a tire mounted on a spare wheel, or rim and ready to replace a vehicle wheel whose tire has gone flat.

While it is known in conventional types of pick-up trucks and similar vehicles to mount the spare tire on a fixed rack disposed beneath the truck bed, such mountings are not usually readily accessible and it is often necessary to crawl under the vehicle to gain access to the fastenings to remove the tire.

In the present invention a carrier is provided beneath the truck bed for rigidly holding a spare tire lying thereunder, in a horizontal plane, the tire and carrier being substantially completely hidden and obstructed from removal by a combined bumper and tow hitch plate, the hitch plate being releasably mounted as a central portion of the bumper flanked by two side, or end portions, and being liftable and turnable to provide access to the spare tire holder. The spare tire holder is equipped with a readily releasable clamp enabling a person standing at the rear of the pick-up truck to slide the spare tire rearwardly from its carrier to remove the tire for use on the vehicle.

It is a primary object of the invention to provide a spare tire carrier in which the spare tire is stowed out of the way but, nevertheless, is readily accessible for removal and use.

Another object of the invention is to provide a spare tire carrier which will support a spare tire firmly and against rattling and displacement, yet which will present the spare tire for use in a facile way upon shifting movement of the hitch plate forming the central portion of the rear bumper.

A further object of the invention is to provide a spare tire carrier for a towing vehicle in which the towing connections and the spare tire mounting arrangement are interrelated for mutual cooperation, use, and support.

It is yet a further object of the invention to provide a spare tire carrier which readily lends itself for use with a "utility" type of bumper, and which is equally susceptible to ready installation either at the time of vehicle manufacture, or at a later time.

A still further object of the invention is to provide a combination hitch, bumper and spare tire carrier which is compact, durable and rugged, and yet relatively ecomonical to fabricate, or purchase, and install.

The novel features that are considered characteristic of the invention are set forth with particularity in the appended claims. The invention, itself, however, both as to its organization and its method of operation, together with additional objects and advantages thereof, will best be understood from the following description of a specific embodiment when read in connection with the accompanying drawings, wherein like reference characters indicate like parts throughout the several Figures, and in which:

FIG. 3 is a sectional plan view of the combined spare tire carrier, bumper and hitch plate taken along line 3—3 of FIG. 2, and looking downwardly in the direction of the arrows;

FIG. 4 is a fragmentary sectional view taken along line 4—4 of FIG. 3, looking in the direction of the arrows;

FIG. 5 is a sectional view taken along line 5—5 of FIG. 3, looking in the direction of the arrows, but with the tire carrier clamp released and the hitch plate elevated for removal of the spare tire;

FIG. 6 is a fragmentary top plan view of a modified form of the invention;

FIG. 7 is a side elevation of the structure of FIG. 6;

FIG. 8 is a fragmentary horizontal section taken on the line 8—8 of FIG. 7, looking in the direction of the arrows;

FIG. 9 is a fragmentary rear elevation of the bumper of FIG. 6;

FIG. 10 is a fragmentary vertical sectional view taken on the line 10—10 of FIG. 9, looking in the direction of the arrows;

FIG. 11 is a view similar to FIG. 10 showing the hitch plate elevated;

FIG. 12 is a fragmentary horizontal sectional view taken on the line 12—12 of FIG. 11, looking in the direction of the arrows; and FIG. 13 is a fragmentary vertical sectional view taken on the line 13—13 of FIG. 6, looking in the direction of the arrows.

Figure 1:
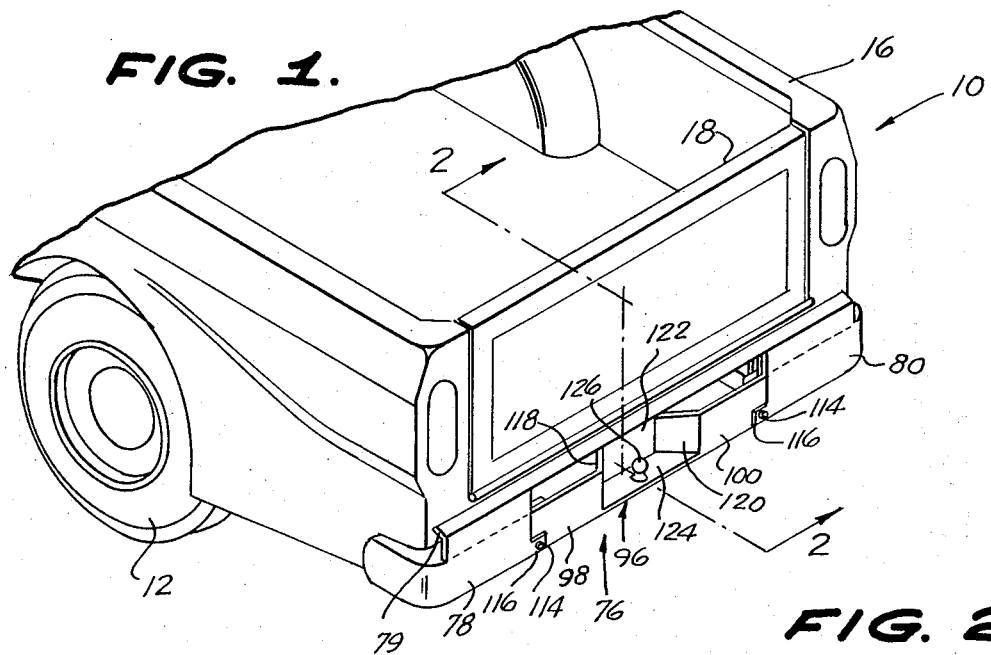
FIG. 1 is a perspective view of the rear portion of a pick-up truck in which is installed a spare tire carrier combined with a bumper and hitch plate according to the invention.

While the combined hitch, bumper and spare tire carrier according to the invention can be embodied in various vehicles, the invention is herein illustrated in one typical installation wherein the towing vehicle 10 is represented as a pick-up truck having rear driving wheels 12, 14, a box body 16 with bed or floor 17, a horizontally hinged tailgate 18, and a main frame 20 including substantially parallel side rails 22, 24 of the customary type. These rails extend longitudinally of the vehicle generally in a horizontal plane, but dipping therebelow somewhat at the rear, and are joined by a number of transverse rails such as 26 and 28.

Figure 2:
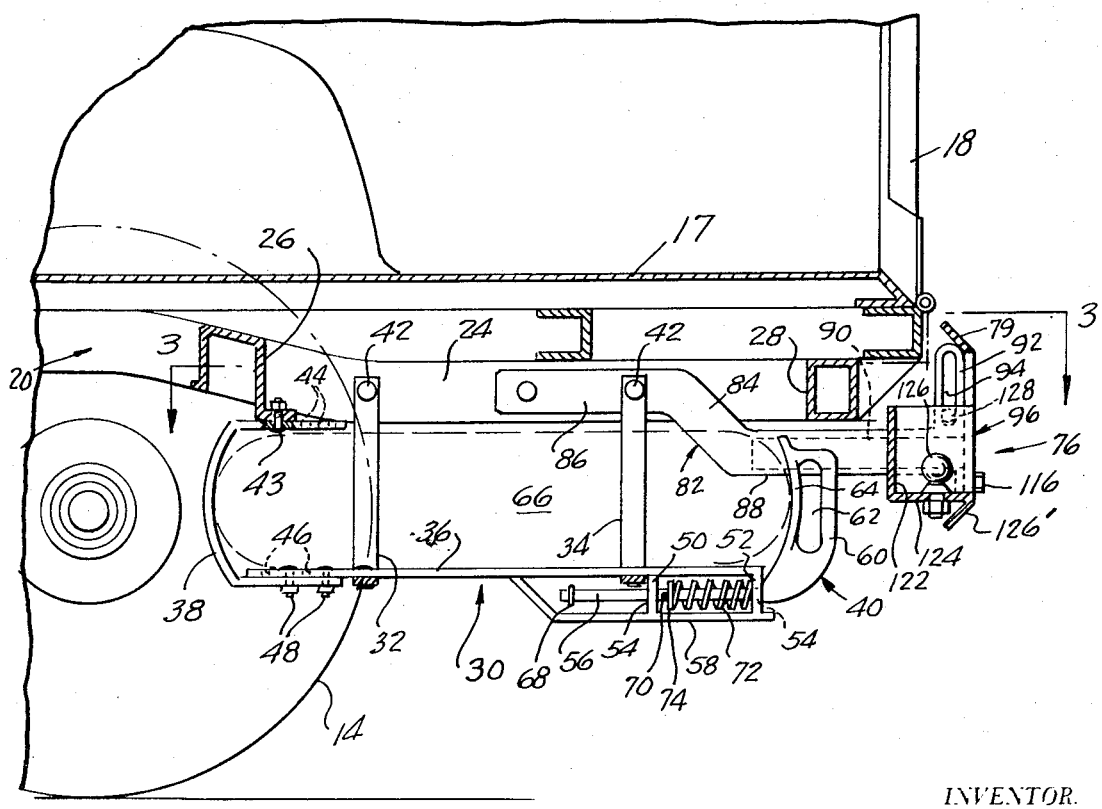
FIG. 2 is a longitudinal sectional view taken along line 2—2 of FIG. 1, and looking in the direction of the arrows.

The spare tire carrier 30 is illustrated in FIGS. 2, 3 and 5 as including a pair of transverse, U-shaped straps 32,34 secured in spaced relation at their upper ends to the opposite side rails of the vehicle frame 20, a longitudinal strap 36 connected to the U-shaped straps centrally of the bights thereof by rivets, or the like, an extension strap 38 extending from the forward end of the longitudinal strap and bent upwardly and then rearwardly for connection to transverse rail 26 of the truck frame, and a spring-pressed, rotatably releasable tire clamp 40.

The U-shaped straps 32, 34 are affixed to the side rails by means of bolts 42, or any other conventional fasteners. A plurality of spaced openings 46 are provided in the forward end of the longitudinal strap 36 to receive bolts 48 which adjustably secure the forward strap 38 to the longitudinal strap. Similarly, uniformly spaced holes 44 are provided in the upper leg of strap 38 for selective cooperation with bolt 43 and rail 26 to permit strap 38 to be adjusted forwardly or rearwardly to accommodate different sized tires. Formed on the rear underside of the longitudinal strap 36, or welded thereto, are a pair of spaced vertical lugs 50, 52 each having an aperture 54 to slidably receive a rod portion 56 of the tire clamp 40. Welded to the bottoms of these lugs is another strap 58 whose forward end is bent upwardly and welded to the bottom of the longitudinal strap at an intermediate portion thereof. The rear end of strap 58 extends rearwardly beyond the lug 52 to form a stop against turning movement of the clamp handle 60 and to hold the handle, when turned, in a horizontal position leaving maximum clearing space below the vehicle.

The tire clamp 40 comprises the vertically disposed handle 60 including a slot 62 to receive the fingers of an operator, and a forwardly disposed arcuate wall 64 which engages the rear side of the spare tire 66 to hold it cradled within the straps 32, 34, 36 and 38. Extending rearwardly from the bottom of the handle 60 is the aforementioned rod 56 having a stop washer 68 affixed to its forward end, and a cotter pin 70 in its intermediate portion. The rod is surrounded by a coil spring 72 which seats between the two lugs 50, 52 and with its forward end abutting a washer 74 held against movement by said cotter pin. It will be apparent that the coil spring 72 is compressed between the rear lug 52 and the washer 74 which is prevented from forward movement along the rod 56 by the cotter pin so that when the handle 60 is pulled rearwardly away from the tire and against the pressure of the spring, the handle is free to be turned to a horizontal position and released to take the position shown in FIG. 5. The spare tire 66 is then free to be moved rearwardly from its cradle comprising the straps 32, 34, 36 and 38, as shown in this figure.

Access to operate the handle in the afore-described manner is normally prevented by the covering, combined bumper and hitch plate, generally referenced 76, at the rear of the vehicle. The bumper comprises a pair of curved end portions 78, 80 made of heavy metal and wrapped around the rear corners of the vehicle. The bumper portions may have any suitable, stiffening cross-sections and are tied together by a narrow, angled, trim strip 79 for pleasing appearance. Bumpers 78, 80 are secured to the vehicle frame by a pair of elongated bracket arms 82, each of which includes a central, downwardly bent portion 84 and two end portions 86, 88, more-or-less parallel to each other. The forward portions of the bracket arms are secured to their adjacent vehicle frame rails 22, 24 by means of bolts, or the like, one of which may be common with the bolt 42 which secures the tire carrier strap 34. The rear ends of the bracket arms are welded, or otherwise secured to the bumper end portions. Each bumper end portion is preferably braced by a diagonal bar 90 whose rear end is welded to the bumper and whose forward end is welded to the rear portion 88 of the adjacent bumper mounting arm 82. An upstanding bracket 92 is formed on the rear end of each bracket arm 82 and provided with an elongated vertical slot 94 for a purpose to be later described.

The central portion of the bumper is occupied by a hitch plate 96 of special configuration having vertical walls 98, 100 which align with the corresponding vertical walls of the bumper end portions 78, 80 and present flush outer surfaces therewith. At the bottom corners of the hitch plate, forwardly offset flanges, or recesses 112 are provided to receive laterally projecting tabs 114 on the bumper end portions, the tabs being rearwardly disposed with respect to the hitch plate. A pair of threaded bolts 116 pass through threaded apertures in the tabs 114 and the walls of the hitch plate recesses 112 so as to unite the hitch plate to the bumper. The described construction is such that tensional and torsional forces engendered by towing a vehicle connected to the hitch plate are transferred through the walls of recesses 112 to the forward surfaces of the tabs 114 of the bumper end portions and through the bumper mount arms 82 and brace arms 90 to the vehicle frame. Thus, the towing forces are not directed solely against the heads of the bolts 116 which would be likely to pull the heads off, or shear them from their shanks. It should be further noted, that the bolts 116 are provided with heads which are of the same size and shape as the vehicle wheel-supporting bolts, so that the same wrench provided with the vehicle for changing tires may be used to disconnect the hitch plate.

As will be apparent from FIGS. 1 and 2, the central portion of the hitch plate 96 comprises inwardly inclined portions of walls 98 and 100 labeled 118 and 120, respectively, which are continued, or joined in the vertical, offset wall 122. A horizontal wall 124 extends inwardly from the downwardly inturned flange 126' of the hitch plate 96 and is joined to walls 118, 120 and 122 to form a box-like compartment. A towing hitch ball 126 is bolted through an aperture in said bottom wall 124 of the hitch plate. At the forward side of each end of the hitch plate, a laterally disposed pin 128 is welded which rides in the vertical slot 94 of bracket 92 previously described. When the bolts 116 are removed to release the hitch plate, the latter may be lifted, guided by movement of the pins 128 in the slots 94. Referring to FIG. 3, it may be seen that at least one end of the hitch plate is provided with a pair of spaced forwardly extending lugs 130 welded to the forward surface thereof. Each lug 130 is provided with an aperture aligned with each other and a latch pin 132 having a bent handle portion 134 is slidable in said apertures. A coil spring 135 placed between the two lugs 130 with one end abutting a washer 136, or the like, affixed thereto, biases the latch pin downwardly, as viewed in FIG. 3, the latch pin being spaced forwardly of the adjacent hinge pin 128. When the hitch plate is lifted and rotated to the position shown in FIG. 5, the latch pin 132 will be aligned with the slot 94 and may be manually pushed into said slot against the pressure of spring 135. This will retain the hitch plate in its upper position, shown in FIG. 5, by reason of the gravity of the hinge plate providing a torsional force on the latch pin 132 whose friction against the wall of the slot 94 prevents the hitch plate from swinging down to its normal position. Thus, an operator is free to use both of his hands to pull the spare tire 66 out of its carrier in a rearward direction, as shown by the broken arrow in FIG. 5. To release the hitch plate, the latch pin handle 134 is pulled to the left, or downwardly as viewed in FIG. 3, so as to remove the latch pin 132 from the slot 94, freeing the hitch plate to drop and turn to occupy its normal towing position. The operator may then refasten the hitch plate to the bumper end portions by application of the bolts 116.

After a tire has been placed, or replaced by pushing into the carrier formed by the straps 32, 34, 36 and 38, the operator grasps the handle 60, in its horizontal position of FIG. 5, and pulls it rearwardly against the pressure of the spring 72. The handle may then be turned to its vertical position, shown in FIG. 2, and released. The coil spring will then pull the forward arcuate surface of wall 64 of the handle into engagement with the spare tire, firmly holding it against rattling within the tire carrier.

The hitch plate 96 may then be released by release of latch pin 132 and returned to its normal position, in the manner described in the preceding paragraph, and refastened to bumpers 78, 80 hiding the spare tire until again needed to replace another tire on the vehicle.

In FIGS. 6 through 13 a modified form of the spare tire carrier is illustrated generally at 230.

The spare tire carrier 230 is adapted for use with the same type vehicles as that described in the specification referring to FIGS. 1 through 5 and includes a main frame including substantially parallel side rails 22, 24 of the customary type. These rails extend longitudinally of the vehicle generally in a horizontal plane, but dipping therebelow somewhat at the rear, and are joined by a number of transverse rails such as 28.

The spare tire carrier 230 as illustrated in FIG. 6 includes a generally U-shaped strap 232 secured by bolts 233 to the side rails 22, 24. A generally horizontal strap 234 is positioned in the same horizontal plane as the bottom of the U-shaped strap 232 and extends parallel thereto. A hanger 235 has a flat upper end portion secured to the rails 22, 24 and an integral threaded bolt portion 236 depending therefrom. The strap 234 has upwardly offset end portions 237 through which the bolt portion 236 extends and which is supported by a nut 238 on the bolt portion 236. The upwardly offset portion 237 on the strap 234 engages the nut 238 to prevent it from rotating on the bolt portion 236 when the strap 234 is resting thereon.

A longitudinal strap 239 is supported on and secured to the strap 234 by means of a bolt 240 and the strap 232 by means of a bolt 241. A longitudinal strap 239 has a U-shaped extension 242 integrally formed thereon and extending from the front end thereof upwardly to encompass a tire T supported on the strap 232, 234 and 239. A pair of bracket arms 282 are secured to the rails 22, 24 and extend rearwardly therefrom in spaced apart parallel relation to support a bumper indicated generally at 283. Diagonal bars 290 brace the bumper 283 and assist in maintaining it in a secure position.

The bumper 283 includes opposite end portions 278', 280 and a combined bumper and hitch plate unit 278 positioned intermediate the end portions 278', 280. The brackets 282 and diagonal bars 290 are conventionally secured to the bumper 283 by welding or the like. Each of the brackets 282 have a pin 284 extending horizontally inwardly in axially aligned relation adjacent the upper edges of the bumper 283. The combined bumper and hitch plate unit 278 has a cam slot plate 285 secured to the opposite side portions thereof in rearwardly extending spaced parallel relation. The cam slot plates 285 each have a cam slot 286 extending therein in a generally U-shaped form. The bumper 283 adjacent each of the side portions 278', 280 has a short inwardly extending sloping plate 287 arranged in spaced relation to a short vertical plate 288 to form an opened bottom wedge pocket therebetween to receive a wedge shape keeper bar 289 secured to the lower side edges of the hitch plate unit 278.

The wedge shaped keeper bar 289 has a threaded bore 290 extending therethrough to receive a bolt 291 which extends through a bore 292 in the upright plate 288.

A combined bumper and hitch plate unit 278 includes a flat horizontal hitch plate 293 having a plurality of spaced apart bores 294 formed therein to receive a trailer ball and safety chains. An upright wall 295 is secured to the hitch plate 293 and extends thereacross transversely of the rails 22, 24. The upright wall 295 has outwardly and rearwardly extending side portions 296, 297 and outer side portions 298, 299 integrally secured thereto. A trim strap 300 is secured to the upper edges of the upright walls 295, 296, 297, 298 and 299 to extend completely across the unit 278. A license plate is adapted to be secured to the upright wall 295 and a license plate light 301 is secured to the upright diverging wall 297 to illuminate the license plate on the wall 295.

A keeper clip 302 is integrally formed on the upper face of the bumper 230 closely adjacent the inner end of the end portion 278 where it is adapted to engage the trim strap 300 with the hitch plate 278 in its upper position.

In the use and operation of the modified form of the invention illustrated in FIGS. 6 through 13 the hitch plate 278 is secured in its normal operating position by means of a pair of bolts 291 which extend through the plate 288 and into the wedged shape members 289 locking them between the plate 287 and the plate 288. When it is desired to remove the tire T from the carrier 230 the bolts 291 are removed and the hitch plate 278 is raised so that the slot 286 travels upwardly on the pins 284 to first lift the wedge members 289 out from in front of the bars 288 and then to pivot the hitch plate 278 from the position illustrated in FIG. 10 to the position illustrated in FIG. 11 where it is moved vertically downwardly to engage the trim plate 300 behind the clip 302 to lock the hitch plate 278 in its upper tire releasing position.

After the tire has been removed and replaced the hitch plate 278 is pivoted out of its engagement behind the clip 302 and is moved downwardly to the position illustrated in FIG. 10 and the bolts 291 are engaged therethrough to lock it in this position.

Having thus described the preferred embodiments of the invention it should be understood that numerous structural modifications and adaptations may be

What is claimed is:

1. A spare tire mount, for a vehicle having a frame including a pair of spaced longitudinal side rails and a transverse rail, comprising a pair of spaced U-shaped straps for securement at their upper ends to said longitudinal rails with their bights dependent transversely therebelow, a longitudinal strap connecting the bights of said U-shaped straps, an extension strap secured at its lower end to the forward end of said longitudinal strap and being bent upwardly and rearwardly and terminating at its upper end in means for securement to the vehicle transverse rail, and a spring-pressed tire clamp secured to the rear end of said longitudinal strap, said tire clamp comprising a vertically disposed handle having an arcuate, forward wall surface engageable with a tire cradled in said straps, a forwardly projecting rod secured to the bottom of said handle, a pair of spaced lugs dependent from said longitudinal strap each having an aperture slidably receiving said rod, a coil spring surrounding said rod in the space between said lugs, and means connecting said rod to the forward end of said coil spring so as to compress the coil spring upon rearward movement of said handle, whereby said handle may be pulled rearwardly to disengage its arcuate surface from a tire and turned about the axis of said rod to permit removal of the tire from the cradling straps in a rearward direction.

2. A spare tire mount according to claim 1, wherein an additional strap is secured to the lower ends of said lugs on the longitudinal strap and projects rearwardly of the rear most lug into the path of turning movement of said handle, whereby once the handle has been turned through a 90° arc and released further turning in a downward direction is prevented.

3. A spare tire mount, for a vehicle having a frame including a pair of spaced longitudinal side rails, comprising a pair of spaced U-shaped straps for securement at their upper ends to said longitudinal rails with their bights dependent transversely therebelow, a longitudinal strap connecting the bights of said U-shaped straps, and means extending said longitudinal strap forwardly, said means being bent upwardly and rearwardly for cradling a tire, in combination with a rear bumper having a hitch plate forming its central portion and a pair of side bumper portions for extending to the sides of the vehicle, longitudinal bracket arms for securing said side bumper portions to the longitudinal rails of the vehicle, means for securing said hitch plate to said side bumper portions, means for lifting and turning said hitch plate to provide access to a spare tire cradled in said straps and for ready removal thereof rearwardly and between the side bumper portions, said means for lifting and turning the hitch plate including a bracket having an upwardly disposed slot therein affixed to each of said bumper portions, said hitch plate having laterally projecting pins riding in said slots of said brackets, whereby upon unfastening of said hitch plate securing means the hitch plate may be lifted and guided by said pins and slots and turned to permit access to a spare tire cradled in said straps.

4. The combination according to claim 3, wherein said hitch plate carries a forwardly projecting lug having a lateral opening therethrough, and a latch member slidably disposed in said opening forward of the adjacent pin and spring-pressed away from the adjacent slot, whereby when the hitch plate is lifted and turned upwardly and outwardly said latch member is aligned with the adjacent slot of the bumper side section and may be pushed into said slot against the pressure of its spring to hold the hitch plate in its upper turned position.

5. The combination according to claim 4, wherein said hitch plate comprises vertically disposed sidewall sections flush with said side bumper portions, said sidewalls being angled forwardly toward each other and connected by a vertical forwardly offset wall section and a horizontal central wall to form a recess, and a hitch ball disposed in said recess and connected to said horizontal central wall.

6. The combination according to claim 5, wherein said side bumper portions are connected at their upper portions by a forwardly and upwardly angled trim strip extending over the hitch plate when in its normal towing position.

7. The combination according to claim 5, wherein said means for securing said bumper side portions to said hitch plate comprises a forwardly offset flange on each side bumper portion and a laterally extending tab at each end of said hitch plate, aligned apertures in said flanges and tabs, and bolt means passing through said aligned apertures to secure the flanges and tabs together.

8. A spare tire mount, for a vehicle having a frame including a pair of spaced longitudinal side rails and a transverse rail, comprising a U-shaped strap secured at its upper ends to said longitudinal rails with its bight dependent transversely therebelow, a horizontal strap positioned parallel to and at the elevation of the bight of said U-shaped strap, means adjustably supporting said horizontal strap from said side rails, a longitudinal strap secured to said U-shaped strap bight and said horizontal strap, said longitudinal strap having an upwardly extending U-shaped end portion integrally formed on the forward end thereof to encompass the forward end of a spare tire supported on said U-shaped strap, said horizontal strap and said longitudinal strap, in combination with a rear bumper having a hitch plate forming its central portion and a pair of side bumper portions extending therefrom to the sides of the vehicle, longitudinal bracket arms for securing said bumper to the longitudinal rails of the vehicle, means for securing said hitch plate to said side bumper portions, means on said hitch plate cooperating with means on said side bumper portions for guiding said hitch plate when moving it from its normal position to a raised horizontal position to provide access to a spare tire cradled in said straps to permit the ready removal thereof rearwardly between the side bumper portions, the means on said hitch plate for guiding said hitch plate including a pair of spaced parallel cam slot plates having a generally upright U-shaped cam slot formed therein and a horizontally extending guide pin on each of said side portions engaging in a respective one of said cam slots.

9. A device as claimed in claim 8 wherein the means for securing said hitch plate to said side bumper portions includes a wedge socket formed on said side bumper portions and a pair of wedge members formed on said hitch plate and engageable in said sockets, and means for locking said wedge members in said sockets.

10. A device as claimed in claim 8 wherein a retainer clip is integrally formed on one of said side portions of said bumper for engaging with a portion of said hitch plate to secure said hitch plate in elevated horizontal position.

11. A device as claimed in claim 8 wherein said hitch plate includes a generally flat horizontal plate having a plurality of bores extending vertically therethrough to receive a trailer ball and safety chains detachably connected therein.

12. A device as claimed in claim 8 wherein said hitch plate includes a vertical wall for supporting a license plate and a license plate light secured thereto for illuminating the license plate supported on said vertical wall.

* * * * *